United States Patent
Wang et al.

(10) Patent No.: US 12,198,341 B2
(45) Date of Patent: Jan. 14, 2025

(54) PERSONALIZED REGISTRATION METHOD FOR TEMPLATE LIBRARY OF ANATOMICAL MORPHOLOGY AND MECHANICAL PROPERTIES OF MATERIALS OF BONE CT IMAGES

(71) Applicant: DALIAN UNIVERSITY OF TECHNOLOGY, Liaoning (CN)

(72) Inventors: Hongkai Wang, Liaoning (CN); Haoyu Zhai, Liaoning (CN); Jinwu Wang, Liaoning (CN); Hairong Tao, Liaoning (CN); Kang Li, Liaoning (CN); Xiao Zhang, Liaoning (CN); Xiaomin Cheng, Liaoning (CN); Moyu Shao, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 382 days.

(21) Appl. No.: 17/841,222

(22) Filed: Jun. 15, 2022

(65) Prior Publication Data
US 2023/0146649 A1 May 11, 2023

(30) Foreign Application Priority Data
Nov. 9, 2021 (CN) .......................... 202111317598.3

(51) Int. Cl.
*G06T 7/00* (2017.01)
*G06T 7/38* (2017.01)
(Continued)

(52) U.S. Cl.
CPC .............. *G06T 7/0012* (2013.01); *G06T 7/38* (2017.01); *G06V 10/758* (2022.01);
(Continued)

(58) Field of Classification Search
CPC ..................... G06T 7/0012; G06T 7/38; G06T 2207/10081; G06T 2207/30008;
(Continued)

(56) References Cited

U.S. PATENT DOCUMENTS

2016/0275674 A1* 9/2016 Rivet-Sabourin ....... G06T 7/136
2017/0079721 A1* 3/2017 Zhao ...................... B33Y 50/00

FOREIGN PATENT DOCUMENTS

CN 114155286 B 5/2022

* cited by examiner

*Primary Examiner* — Jianxun Yang
(74) *Attorney, Agent, or Firm* — MUNCY, GEISSLER, OLDS & LOWE, P.C.

(57) ABSTRACT

The present invention provides a personalized registration method for a template library of anatomical morphology and mechanical properties of materials of bone CT images. In the method, a large number of bone CT images of healthy persons are used to build a statistical model capable of containing anatomical morphology and mechanical properties of materials of bones, the parameterized description of bones of a patient is realized by a personalized registration method for the statistical model and bone CT images, a prosthesis template library is built by using images of the patient and registration parameters, and the template library is matched with the CT images of the patient by the personalized registration method to retrieve template images and prosthesis models similar to the bone conditions of the patient from the template library as the initial reference template for design of personalized prosthesis implants.

3 Claims, 3 Drawing Sheets

(51) Int. Cl.
*G06V 10/75* (2022.01)
*G06V 10/77* (2022.01)

(52) U.S. Cl.
CPC ............ *G06V 10/7715* (2022.01); *G06T 2207/10081* (2013.01); *G06T 2207/30008* (2013.01)

(58) Field of Classification Search
CPC .... G06T 7/30; G06T 7/33; G06T 7/73; G06T 7/90; G06V 10/758; G06V 10/7715; G06V 20/64; G06V 2201/033; G06F 16/532
See application file for complete search history.

PERSONALIZED REGISTRATION METHOD FOR TEMPLATE LIBRARY OF ANATOMICAL MORPHOLOGY AND MECHANICAL PROPERTIES OF MATERIALS OF BONE CT IMAGES

TECHNICAL FIELD

The present invention relates to the technical field of digital treatment and image processing, and particularly relates to a personalized registration method for a template library of anatomical morphology and mechanical properties of materials of bone CT images, which is mainly applicable to the shape design and the analysis of mechanical properties of materials of prosthesis implants for damaged bones of a patient.

BACKGROUND

The human skeletal system is often damaged due to the influence of lesions, trauma, fractures and other factors. In most cases, prosthesis implants are required for surgical operation to repair damaged bones. In order to ensure the success of surgical intervention, it is necessary for doctors to formulate a good preoperative plan and design and select an appropriate personalized prosthesis implant. In recent years, with the development of personalized digital treatment and 3D printing technology, professional orthopedists use computed tomography (CT) images of the patient to build a 3D skeleton model, analyze the anatomical morphology of individual bones and customize personalized prosthesis implants for the patient, and the 3D printing technology is used to fabricate prostheses. The personalized design of prosthesis implants is a tedious and time-consuming task. If a prosthesis template library containing anatomical morphology and mechanical properties of materials is built to realize personalized registration of the template library and bone CT images of the patient, template images and prosthesis models with morphology and gray similar to those of the bones of the patient can be retrieved and matched in the template library, which provides an initial reference template for doctors to perform design of personalized prosthesis implants and saves the design time. In addition, the parameterized representation of the bone shape and gray of the patient can also be used in researches on virtual surgical planning, bone defect analysis, material design of personalized implants and other aspects.

In order to realize the personalized registration method for the template library based on anatomical morphology and mechanical properties, it is necessary to obtain a large number of bone CT images of healthy persons first for statistical modeling of shape and gray. The deformation field obtained by image registration describes the position changes of corresponding pixels between images, and the deformation field of an area where the bone is located can describe the changes of bone morphology so as to build a shape model; and the gray value of CT images reflects the attenuation coefficient of the bone to X-ray, has an approximate linear relationship with the apparent density of the bone and characterizes the mechanical properties of materials of the bone, and the gray value of CT images is used for gray modeling of the gray (density) of the bone. Shape parameters and gray parameters describing the bone information can be obtained by the personalized registration method for the statistical model and the CT images of the patient, and a prosthesis template library containing anatomical morphology and mechanical properties of materials can be built together with the prosthesis model of the patient. The similarity formula is used to evaluate the degree of similarity of the shape and gray of CT images of the patient to those of sample images in the template library to obtain the sample image and prosthesis model with the highest similarity to the bone of the patient, which are used as the reference bone prosthesis of the patient, facilitating the doctors to design the prosthesis implant and analyze the mechanical properties of materials of the bone.

SUMMARY

The present invention proposes a personalized registration method for a template library of anatomical morphology and mechanical properties of materials of bone CT images, in which a large number of bone CT images of healthy persons are used to build a statistical model capable of containing anatomical morphology and mechanical properties of materials of bones, the parameterized description of bones of a patient is realized by a personalized registration method for the statistical model and bone CT images, a prosthesis template library is built by using images of the patient and registration parameters, and the prosthesis template library is matched with the bone CT images of the patient by the personalized registration method to retrieve template images and prosthesis models similar to the bone conditions of the patient from the template library as the initial reference template for doctors to design personalized prosthesis implants.

To realize the above purpose, the present invention is realized through the following technical solution: a personalized registration method for a template library of anatomical morphology and mechanical properties of materials of bone CT images, comprises the following steps:

S1: building a statistical model containing a shape model of anatomical morphology of bones and a gray model of mechanical properties of materials; S11: processing data; collating a large number of bone CT images of healthy persons as a sample set, and normalizing pixel resolutions and gray ranges of the sample set; resampling the unified spatial resolution, and selecting the finest spatial resolution; and using the unified CT value range to normalize the gray of images to eliminate the influence of outliers.

S12: calibrating anatomical characteristic information; the anatomical characteristic information refers to the symbolic information in bone CT images, which can significantly reflect the changes of morphological structure and density of bones or have medical significance, such as anatomical landmarks or masks for bone segmentation. Marking anatomical landmarks of all the sample images in the sample set, and donating as $L=\{(x_1, y_1, z_1), \ldots, (x_i, y_i, z_i), \ldots, (x_k, y_k, z_k)\}$, wherein k is the number of the anatomical landmarks, and $(x_i, y_i, z_i)$ represents the 3D coordinate of the $i^{th}$ point;

S13: building an average template image; selecting an average image or any sample image from the sample set as the initial template, deforming all the samples into the space of the average image by means of image registration, calculating a new average image to substitute the initial template image, and repeating the registration operation until the average template image no longer changes.

S14: modeling the shape; obtaining the position changes of corresponding pixels between images through image registration; the deformation field of an area where the bone is located describes the morphology change of the bone, and the deformation field is used to build a shape model of the bone; and the specific steps are as follows:

S141: calculating shape vectors; calculating nonlinear spatial transformation between the sample image and the average template image by means of image registration, building a shape vector for each sample, and letting $s_i=[p_i, l_i] \in R^{3N}$ as the shape vector of the sample i, wherein $p_i \in R^{3N}$ is a 3D coordinate set of N pixels obtained by registering the average template to the sample i, and $l_i \in R^{3K}$ is a 3D coordinate set of K anatomical landmarks in the sample image;

S142: aligning the shape vectors $s_i$ of all the samples by generalized procrustes analysis (GPA);

S143: modeling the shape change of the bone by principal component analysis (PCA); the shape model is as follows:

$$s=\bar{s}+\Phi_s b_s$$

wherein $\bar{s} \in R^{3N}$ represents the average shape of the sample set, $\Phi_s \in R^{3(N+K) \times M}$ represents an eigenvector matrix obtained by PCA of the sample set, and M feature vectors represent M bone deformation patterns learned by the shape model; $b_s \in R^M$ is a shape parameter, and M elements in $b_s$ respectively represent weights of M deformation patterns in $\Phi_s$ superimposed with the average shape; and $s \in R^{3(N+K)}$ represents the shape of the model, s is under control of $b_s$, and the purpose of controlling model deformation is achieved by adjusting the value of $b_s$.

S15: modeling the gray; the gray value of CT images reflects the attenuation coefficient of organs to X-ray, and the high contrast of bone CT images with surrounding soft tissues accurately describes the geometrical morphology of the bone;

Statistically modeling the gray of the bone by using the gray value of the CT images; and modeling the gray for all the bone CT images by PCA after down-sampling of the CT images, with the formula as follows:

$$g=+\bar{g}+\Phi_g b_g$$

wherein $\bar{g} \in R^N$ represents the average gray vector of the sample set; $\Phi_g \in R^{N \times M}$ is a gray feature matrix of the gray model in the statistical model obtained by PCA of the sample set, containing M gray changing patterns learned from the sample set, and the subscript g represents the gray; and $b_g \in R^M$ is a gray parameter, $g \in R^N$ represents the gray of the model, the value of g is under control of the gray parameter $b_g$, and the purpose of controlling the gray change of the model is achieved by adjusting the value of the gray parameter $b_g$.

S2: building a prosthesis template library;

S21: collecting and processing data; establishing a pre-implantation data set $D_1$ and a post-implantation data set $D_2$ according to the bone CT image samples before and after bone prosthesis implantation, wherein $D_1$ contains the shape and gray information of damaged bones of the patient, and the post-implantation data set $D_2$ contains the shape and material information of a personalized bone prosthesis; and normalizing pixel resolutions and gray ranges of $D_1$ and $D_2$, and marking the anatomical landmarks of the images in $D_1$;

S22: matching the shape model; registering and fitting the shape model in the statistical model to the bone CT images of the patient not implanted with a bone prosthesis, and calculating the shape parameter $b_s$ of the bone of the patient; and the specific steps are as follows:

S221: sampling; carrying out equidistant sampling on the vertexes of the average shape in the shape model, and selecting a small number of sampling points for subsequent calculation;

S222: carrying out personalized registration; obtaining the mapping relationship, i.e., deformation field, between the average template and the bone image of the patient by the nonlinear registration method of the image, and deforming the vertexes of the average shape in the shape model by using the deformation field to obtain a shape vector describing the bone of the patient;

The gray similarity measure between images and the distance measure of the anatomical landmarks are used as the constraints for the loss function of nonlinear registration, and the objective function is as follows:

$$E=\omega_i E_i + \omega_l E_l$$

wherein E is the weighted similarity measure between the template and the image of the patient, and $E_1$ is the distance measure of the anatomical landmarks; and $\omega_i$ and $\omega_l$ are weights of the two measures, and the sum thereof is 1;

S223: aligning the registered shape vector of the bone of the patient with the average shape vector; wherein similarity transformation is composed of a scaling factor and a rotation matrix, the scaling factor is obtained by calculating the ratio of the distance between the vertex and the centroid of the registered shape vector of the bone to that of the average shape vector, and the rotation matrix is obtained by singular value decomposition of the vertex matrixes of the two shape vectors;

S224: setting the number of the shape parameters $b_s$; directly defining the number of the shape parameters $b_s$ or selecting the number of the shape parameters $b_s$ capable of retaining more than 95% of data information; and extracting the corresponding shape feature matrix $\Phi_s$ from the shape model according to the number of the shape parameters $b_s$;

S225: calculating the shape parameter $b_s$ of the bone of the patient; carrying out linear regression fitting by least squares according to the shape feature matrix $\Phi_s$ extracted from the shape model and the registered shape vector of the bone of the patient, and solving the system of linear equations $\Phi_s b_s = s_p$ to obtain the shape parameter $b_s$ of the bone of the patient; wherein $s_p$ represents the displacement deviation between the shape vector of the bone of the patient and the average shape vector, and $\Phi_s$ represents the shape feature matrix contained in the shape model in the statistical model.

S23: matching the gray model; fitting the gray model in the statistical model to the bone images of the patient not implanted with a bone prosthesis, and calculating the gray parameter $b_g$ of the bone of the patient;

$$\Phi_g b_g = g_p,$$

wherein $g_p$ represents the standard deviation between the gray vector of the sampled bone of the patient and the average gray vector, and $\Phi_g$ represents the gray feature matrix of the gray model in the statistical model;

S24: acquiring a bone prosthesis model; extracting the tagged image of a prosthesis implant from the CT images of the postoperative patient with a prosthesis by the threshold segmentation method, and transforming the tagged image of the prosthesis to a 3D surface model by the Marching Cubes algorithm. Metal prosthesis implants usually show higher CT values in the CT images, for example, the CT value of aluminum metal is about 2000 HU, and stainless steel and titanium alloy reach the highest CT value, i.e., 3071 HU, in ordinary CT images. The CT value of metal prosthesis implants is obviously different from that of internal organs of a human body, the tagged image of the prosthesis implant is extracted from the CT images of the postoperative patient with a prosthesis by the threshold segmentation method, and the tagged image of the prosthesis is transformed to a 3D surface model by the Marching Cubes algorithm.

S25: building a prosthesis template library; building a prosthesis template library based on the statistical model, the CT image data of the patient, the shape parameter and gray parameter of the bone of the patient, and the prosthesis model;

The contents stored in the prosthesis template library contain the parts shown in the table below:

Prosthesis Template Library

| Name | Data Type | Remarks |
|---|---|---|
| Serial No. | int | Unrepeatable, unique |
| File Name | varchar255 | Image file name |
| Storage Path | varchar255 | Absolute path |
| Shape Parameter | varchar255 | File path |
| Average Shape Vector | varchar255 | File path |
| Shape Feature Matrix | varchar255 | File path |
| Gray Parameter | varchar255 | File path |
| Average Gray Vector | varchar255 | File path |
| Gray Feature Matrix | varchar255 | File path |
| Storage Time | timestamp | Automatically affixing timestamp |

The shape feature matrix, the shape parameter, the average shape vector, the gray feature matrix, the gray parameter and the average gray vector cannot be directly stored in the database list because the data amount is too large, and alternatively, can be saved as binary file, and then the storage paths thereof can be stored in the database.

S3. carrying out personalized registration of the template library; obtaining the shape parameter and the gray parameter of the bone through personalized registration of the prosthesis template library and the CT images, and retrieving from the prosthesis template library a prosthesis model matching with the bone in the CT images best;

S31: preprocessing data; acquiring the bone CT images of the patient to be implanted with a bone prosthesis, carrying out unified space and gray normalization on the CT images, and marking the anatomical landmarks of the bone CT images of the patient;

S32: carrying out personalized registration and parameterized representation; carrying out personalized registration on the bone CT images of the patient by using the statistical model, and calculating the shape parameter $b_s'$ and the gray parameter $b_g'$ of the bone of the patient through matching of the shape model and the gray model;

S33: matching data; retrieving the data of template images stored in the prosthesis template library and similar to those of the bone of the patient from the prosthesis template library by using a similarity calculation formula according to the shape parameter and gray parameter describing the bone of the patient obtained by registration, the similarity calculation formula is as follows:

$$D = \lambda_1 \sum_{i=0}^{M}(b_s' - b_s)^2 + \lambda_2 \sum_{i=0}^{M}(b_g' - b_g)^2$$

wherein $\sum_{i=0}^{M}(b_s' - b_s)^2$ is the variance between the shape parameter of the bone of the patient and that of the template image in the prosthesis template library for measurement of the level of similarity in the shape of the bone between two images; $\sum_{i=0}^{M}(b_g' - b_g)^2$ is the variance between the gray parameter of the bone of the patient and that of the template image in the prosthesis template library for measurement of the level of similarity in the gray of the bone between two images; and $\lambda_1$ and $\lambda_2$ are weights of the shape similarity and the gray similarity, the sum thereof is 1, and the values of $\lambda_1$ and $\lambda_2$ are assigned according to different weights to realize the retrieval matching method based on the shape similarity or based on the gray similarity;

Calculating the similarity D between the data in the prosthesis template library and the data of the patient, obtaining the template CT image most similar to the bone of the patient after comparison, and acquiring a bone prosthesis model corresponding to the image as the initial reference template for the personalized bone prosthesis of the patient for subsequent analysis and design of bone prostheses.

The present invention has the following beneficial effects: the statistical model is built by using the bone CT images of healthy persons, the parameterized description of anatomical morphology and mechanical properties of materials of the bone CT images is realized by the personalized registration method, the prosthesis template library is built in accordance with the available data, and the prosthesis model matching with the bone of the patient best is found from the template library through personalized registration of the template library and the images of the patient to achieve the purpose of initialized design of bone prostheses of the patient. In addition, the parameterized representation of the bone shape and gray of the patient can also be used in virtual surgical planning, bone defect analysis, material design of personalized implants and other aspects.

DETAILED DESCRIPTION

Figure 1:
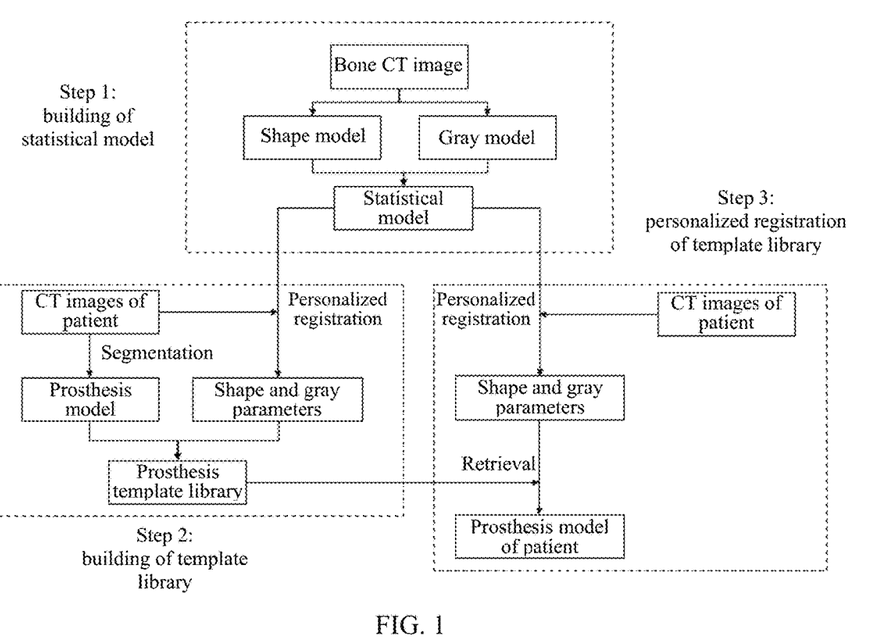
FIG. 1 is an overall work flow chart of personalized registration of a template library.

With the lower hip bone as an example, the present invention is further described in combination with specific implementation steps, as shown in FIG. 1. A personalized registration method for a template library of anatomical morphology and mechanical properties comprises the following steps:

Step 1: building a statistical model containing anatomical morphology and mechanical properties of materials of bones.

S11: preprocessing data. Collating a large number of bone CT images of healthy persons as a sample set, and normalizing the sample set, including normalization of pixel resolutions and gray ranges.

Resampling CT images from different hospitals with uniform spatial resolution to eliminate the inconsistence in spatial resolution. In order to ensure that image information is not lost, the finest spatial resolution of multiple hospitals is selected as the resampling resolution; and using the unified CT value range to normalize the gray of images to eliminate the influence of outliers.

S12: calibrating anatomical characteristic information. The anatomical characteristic information refers to the symbolic information in bone CT images, which can significantly reflect the changes of morphological structure and density of bones or have medical significance, such as anatomical landmarks or masks for bone segmentation.

Marking anatomical landmarks of all the sample images in the sample set by experts, and donating as $L=\{(x_1, y_1, z_1), \ldots, (x_i, y_i, z_i), \ldots, (x_k, y_k, z_k)\}$, wherein k is the number of the anatomical landmarks, and $(x_i, y_i, z_i)$ represents the 3D coordinate of the $i^{th}$ point;

S13: building an average template image. First, selecting an average image or any sample image from the sample set as the initial template, then deforming all the samples into the space of the average image by means of image registration, calculating a new average image to substitute the initial template image, repeating the registration operation, and carrying out loop iteration until the average template image no longer changes.

S14: modeling the shape. A deformation field obtained by image registration describes the position changes of corresponding pixels between images, the deformation field of an area where the bone is located can describe the morphology change of the bone, and the deformation field is used to build a shape model of the bone.

The specific practice is as follows:

S141: calculating shape vectors. Calculating nonlinear spatial transformation between the sample image and the average template image by means of image registration, building a shape vector for each sample, and letting $s_i=[p_i, l_i]\in R^{3N}$ as the shape vector of the sample i, wherein $p_i\in R^{3N}$ is a 3D coordinate set of all the pixels (N in total) obtained by registering the average template to the sample i, and $l_i\in R^{3K}$ is a 3D coordinate set of all the anatomical landmarks (K in total) in the sample image.

S142: performing generalized procrustes analysis (GPA). Before using the shape vectors $s_i$ for statistical modeling, it is necessary to eliminate the shape change caused by other factors. All the shape vectors $s_i$ need to be aligned by rotation and translation in the common coordinate system, and the shape vectors $s_i$ of all the samples are aligned by the GPA method.

S143: performing principal component analysis (PCA). For all the shape vectors $s_i$, modeling the shape change of the bone by the PCA method, and the shape model obtained is shown as follows:

$$s=\bar{s}+\Phi_s b_s$$

wherein $\bar{s}\in R^{3N}$ represents the average shape of the sample set, $\Phi_s\in R^{3(N+K)\times M}$ represents an eigenvector matrix obtained by PCA of the sample set, s represents the shape, and for M feature vectors, M is the number of samples, representing M bone deformation patterns learned by the shape model; and $b_s\in R^M$ is a shape parameter, and M elements in $b_s$ respectively represent weights of M deformation patterns in $\Phi_s$ superimposed with the average shape. $s\in R^{3(N+K)}$ represents the shape of the model, s is under control of $b_s$, and the purpose of controlling model deformation is achieved by adjusting the value of $b_s$.

S15: modeling the gray. The gray value of CT images reflects the attenuation coefficient of organs to X-ray, and the high contrast of bone CT images with surrounding soft tissues can accurately describe the geometrical morphology of the bone. Meanwhile, the CT value has an approximate linear relationship with the apparent density of the bone, and the apparent density of the bone has an empirical formula for the exponential relationship with the properties of materials of the bone, which can accurately describe the mechanical properties of materials of the bone.

Figure 2:
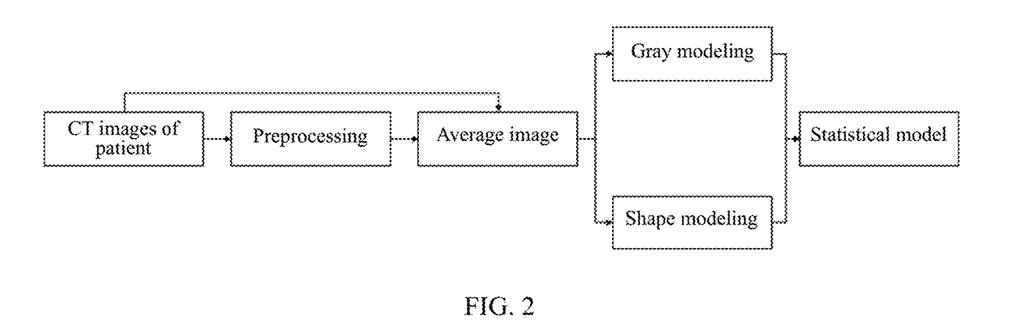
FIG. 2 is a flow chart for building a statistical model.

The gray value of the CT images can be used for statistical modeling of the gray of the bone. Down-sampling performed on the pixels of the sample images with the same scale standard can reduce the calculation amount of the subsequent steps and improve the speed of gray modeling. Letting $g_i\in R^N$ be the gray vector obtained by sampling in the sample i image, which represents the image gray of each pixel in the average template at the corresponding position in the sample i. Modeling all the gray vectors of the sample set, the built model is represented as follows:

$$g=\bar{g}+\Phi_g b_g$$

wherein $\bar{g}\in R^N$ represents the average gray vector of the sample set, $\Phi_g\in R^{N\times M}$ represents a gray feature matrix of the gray model in the statistical model obtained by PCA of the sample set, g represents the gray, containing M gray changing patterns learned from the sample set, $b_g\in R^M$ is a gray parameter, $g\in R^N$ represents the gray of the model, the value of g is under control of the gray parameter $b_g$, and the purpose of controlling the gray change of the model is achieved by adjusting the value of the gray parameter $b_g$. The flow for building the statistical model is shown in FIG. 2.

Step 2: building a prosthesis template library by personalized registration of bone CT images.

S21: collecting and processing data. Collecting and collating preoperative and postoperative bone CT images of a patient implanted with a bone prosthesis, and establishing a preoperative data set $D_1$ and a postoperative data set $D_2$ wherein the preoperative data set $D_1$ contains the morphology and gray (density) information of the damaged bone of the patient, and the postoperative data set $D_2$ contains the shape and material information of a personalized bone prosthesis. Referring to the method of S11 in step 1, normalizing pixel resolutions and gray ranges of the data sets $D_1$ and $D_2$, and marking the anatomical landmarks of the images in the preoperative data set $D_1$ by experts.

S22: matching the shape model. Registering and fitting the shape model in the statistical model to the preoperative bone CT images of the patient, and calculating the shape parameter $b_s$ of the bone of the patient.

The specific steps are as follows:

S221: sampling. Carrying out equidistant sampling on the vertexes of the average shape in the shape model, and selecting a small number of sampling points such as 10000 vertexes for subsequent calculation to reduce the calculation cost and time;

S222: carrying out personalized registration. Obtaining the mapping relationship between the average template and the bone image of the patient by the nonlinear registration method of the image, and deforming the vertexes of the average shape in the shape model by using the deformation field.

The gray similarity measure between images and the distance measure of the anatomical landmarks are used as the constraints for the loss function of nonlinear registration so that the template can be correctly matched with the images of the patient, and the objective function is as follows:

$$E_i=\omega_i E_i+\omega_l E_l$$

Figure 3:
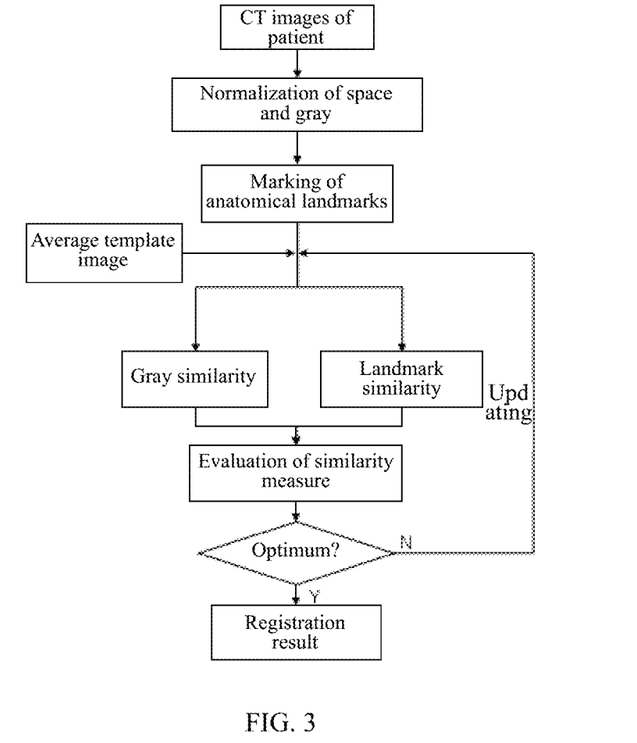
FIG. 3 is a flow chart of a nonlinear registration method.

The gray similarity measure (such as mutual information or mutual correlation) between the images of the patients helps align the template with the undamaged part in the bone CT image of the patient based on gray registration. $E_1$ is the distance measure of the anatomical landmarks, which is used to ensure alignment between the anatomical landmarks in the template and the images of the patient. For the registration of the damaged part of the bone, the surrounding anatomical landmarks can provide guidance to ensure that the registration of the damaged area does not have excessive deformation. $\omega_i$ and $\omega_l$ are weights of the two measures, and the sum thereof is 1. The method the nonlinear registration method is shown in FIG. 3.

S223: aligning the registered shape vector of the bone of the patient with the average shape vector to eliminate the shape effect caused by similarity transformation, wherein similarity transformation is composed of a scaling factor and a rotation matrix, the scaling factor is obtained by calculating the ratio of the distance between the vertex and the centroid of the registered shape vector of the bone to that of the average shape vector, and the rotation matrix is obtained by singular value decomposition of the vertex matrixes of the two shape vectors.

S224: setting the number of the shape parameter $b_s$. Directly defining the number of the shape parameters $b_s$ or selecting the number of the shape parameters $b_s$ capable of retaining more than 95% of data information, and extracting the corresponding shape feature matrix $\Phi_g$ from the shape model according to the number of the shape parameters $b_s$.

S225: Calculating the shape parameter $b_s$ of the bone of the patient. Carrying out linear regression fitting by least squares according to the shape feature matrix $\Phi_s$ extracted from the shape model and the registered shape vector of the bone of the patient, and solving the system of linear equations $\Phi_s b_s = s_p$ to obtain the shape parameter $b_s$ of the bone of the patient, wherein $s_p$ represents the displacement deviation between the shape vector of the bone of the patient and the average shape vector, and $\Phi_s$ represents the shape feature matrix contained in the shape model in the statistical model.

S23: matching the gray model. Fitting the gray model in the statistical model to the bone images of the patient, and calculating the gray parameter $b_g$ of the bone of the patient. Transferring the point cloud describing the bone shape of the patient from a physical space coordinate system to a matrix space coordinate system, wherein the point cloud also expresses the mapping relationship between the average template and the image pixels of the patient, and the result of registering the average template to the image of the patient can be calculated from the image of the patient.

Figure 4A:
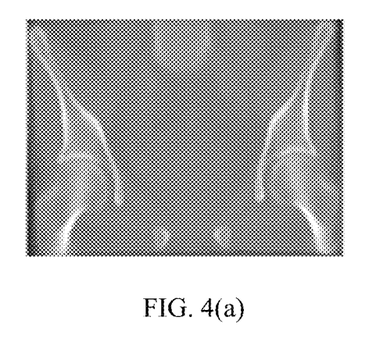
FIG. 4(a) is an average template image for personalized registration.
Figure 4B:
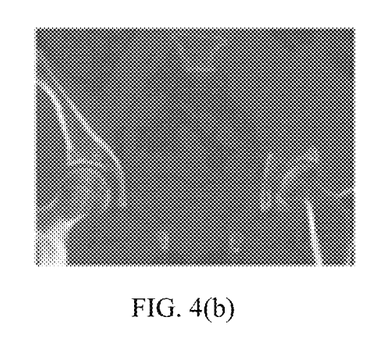
FIG. 4(b) shows an image of a patient for personalized registration.
Figure 5A:
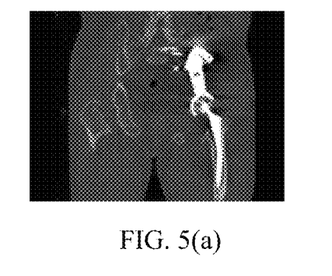
FIG. 5(a) is a CT image of a patient I.
Figure 5B:
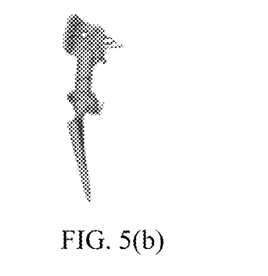
FIG. 5(b) is a diagram of a prosthesis model of the patient I.
Figure 5C:
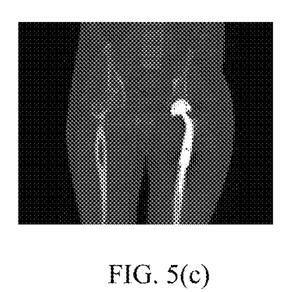
FIG. 5(c) is a CT image of a patient II.
Figure 5D:
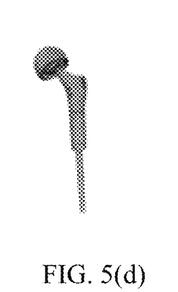
FIG. 5(d) is a diagram of a prosthesis model of the patient II.
Figure 5E:
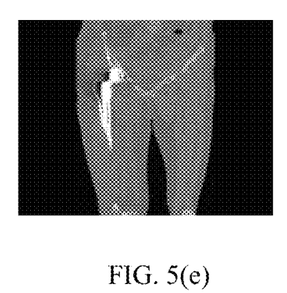
FIG. 5(e) is a CT image of a patient III.
Figure 5F:
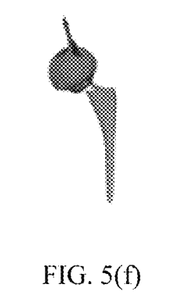
FIG. 5(f) is a diagram of a prosthesis model of the patient III.

Carrying out linear regression fitting by least squares according to the gray vector of the registered image and the gray feature matrix $\Phi_g$ in the gray model, and solving the system of linear equations $\Phi_g b_g = g_p$ to obtain the gray parameter $b_g$ of the bone of the patient, wherein $g_p$ represents the standard deviation between the gray vector of the sampled bone of the patient and the average shape vector, and $\Phi_g$ represents the gray feature matrix contained in the gray model in the statistical model. The parameterized representation of the bone of the patient after personalized registration is shown in FIG. 4.

S24: acquiring a bone prosthesis model. Metal prosthesis implants usually show higher CT values in the CT images, for example, the CT value of aluminum metal is about 2000 HU, and stainless steel and titanium alloy reach the highest CT value, i.e., 3071 HU, in ordinary CT images. The CT value of metal prosthesis implants is obviously different from that of internal organs of a human body, the tagged image of a prosthesis implant can be extracted from the CT images of the postoperative patient with a prosthesis by the threshold segmentation method, and the tagged image of the prosthesis is transformed to a 3D surface model by the Marching Cubes algorithm. The CT image of the postoperative patient and the prosthesis model are shown in FIG. 5.

S25: building a prosthesis template library. Building a prosthesis template library based on the statistical model, the CT image data of the patient, the shape parameter and gray parameter of the bone of the patient, and the prosthesis model. The contents stored in the prosthesis template library contain the parts shown in the table below:

Prosthesis Template Library

| Name | Data Type | Remarks |
| --- | --- | --- |
| Serial No. | int | Unrepeatable, unique |
| File Name | varchar255 | Image file name |
| Storage Path | varchar255 | Absolute path |
| Shape Parameter | varchar255 | File path |
| Average Shape Vector | varchar255 | File path |
| Shape Feature Matrix | varchar255 | File path |
| Gray Parameter | varchar255 | File path |
| Average Gray Vector | varchar255 | File path |
| Gray Feature Matrix | varchar255 | File path |
| Storage Time | timestamp | Automatically affixing timestamp |

The shape feature matrix, the shape parameter, the average shape vector, the gray feature matrix, the gray parameter and the average gray vector cannot be directly stored in the database list because the data amount is too large, and alternatively, can be saved as binary file, and then the storage paths thereof can be stored in the database.

Step 3: carrying out personalized registration of the prosthesis template library.

S31: preprocessing data. Acquiring the bone CT images of the patient to be implanted with a bone prosthesis. Referring to the methods of S11 and S12 in step 1, carrying out unified space and gray normalization on the CT images, and marking the anatomical landmarks of the bone CT images of the patient by experts.

S32: carrying out personalized registration and parameterized representation. Referring to the method of S22 and S23 in step 2, carrying out personalized registration on the bone CT images of the patient by using the statistical model, and calculating the shape parameter b; and the gray parameter by of the bone of the patient through matching of the shape model and the gray model.

S33: matching data. Retrieving the data of template images stored in the prosthesis template library and similar to those of the bone of the patient from the prosthesis template library by using a similarity calculation formula according to the shape parameter and gray parameter describing the bone of the patient obtained by registration, the similarity calculation formula is as follows:

$$D = \lambda_1 \sum_{i=0}^{M}(b'_s - b_s)^2 + \lambda_2 \sum_{i=0}^{M}(b'_g - b_g)^2$$

wherein $\sum_{i=0}^{M}(b'_s - b_s)^2$ is the variance between the shape parameter of the bone of the patient and that of the template image in the prosthesis template library for measurement of the level of similarity in the shape of the bone between two images; $\Sigma_{i=0}^{M}(b_g'-b_g)^2$ is the variance between the gray parameter of the bone of the patient and that of the template image in the prosthesis template library for measurement of the level of similarity in the gray of the bone between two images; $\lambda_1$ and $\lambda_2$ are weights of the shape similarity and the gray similarity, the sum thereof is 1, and the values of $\lambda_1$ and $\lambda_2$ are assigned according to different weights to realize the retrieval matching method based on the shape similarity or based on the gray similarity.

Calculating the similarity D between each column of data in the prosthesis template library and the data of the patient, obtaining the template CT image most similar to the bone of the patient after comparison, and acquiring a bone prosthesis model corresponding to the image as the initial reference template for the personalized bone prosthesis of the patient for doctors to perform subsequent analysis and design of bone prostheses.

With the registration of the hip bone as an example, the anatomical morphology and the gray changes of other bones of a human body are different, the thought and the method of the present invention are also applicable to other bones. Although the embodiments of the present invention have been shown and described, various amendments and improvements made by those ordinary skilled in the art without departing from the principle and basic thought of the present invention shall be considered to belong to the protection scope of the present invention.

The invention claimed is:

1. A personalized registration method for a template library of anatomical morphology and mechanical properties of materials of bone CT images, comprising the following steps:

S1: building a statistical model containing a shape model of anatomical morphology of bones and a gray model of mechanical properties of materials;

S11: processing data; collating a large number of bone CT images of healthy persons as a sample set, and normalizing pixel resolutions and gray ranges of the sample set; and resampling the unified spatial resolution, and selecting the finest spatial resolution;

S12: calibrating anatomical characteristic information; marking anatomical landmarks of all the sample images in the sample set, and denoted as L={(x1, y1, z1), ... , (xi, yi, zi), ... , (xk, yk, zk)}, wherein k is the number of the anatomical landmarks, and (xi, yj, zi) represents the 3D coordinate of the ith landmark;

S13: building an average template image; selecting an average image or any sample image from the sample set as the initial template, deforming all the samples into the space of the average image by means of image registration, calculating a new average image to substitute the initial template image, and repeating the registration operation until the average template image no longer changes;

S14: modeling the shape; obtaining the position changes of corresponding pixels between images through image registration; the deformation field of an area where the bone is located describes the morphology changes of the bone, and the deformation field is used to build a shape model of the bone;

S15: modeling the gray; the gray value of CT images reflects the attenuation coefficient of organs to X-ray, and the high contrast of bone CT images with surrounding soft tissues accurately describes the geometrical morphology of the bone;

statistically modeling the gray of the bone by using the gray value of the CT images; and modeling the gray for all the bone CT images by PCA after down-sampling of the CT images, with the formula as follows:

$$g = \bar{g} + \Phi_g b_g$$

wherein $\bar{g} \in R^N$ represents the average gray vector of the sample set; $\Phi_g \in R^{N \times M}$ is a gray feature matrix of the gray model in the statistical model obtained by PCA of the sample set, containing M gray changing patterns learned from the sample set, and the subscript g represents the gray; and $b_g \in R^M$ is a gray parameter, $g \in R^N$ represents the gray of the model, the value of g is under control of the gray parameter $b_g$, and the purpose of controlling the gray change of the model is achieved by adjusting the value of the gray parameter $b_g$;

S2: building a prosthesis template library;

S21: collecting and processing data; establishing a pre-implantation data set $D_1$ and a post-implantation data set $D_2$ according to the bone CT image samples before and after bone prosthesis implantation, wherein $D_1$ contains the shape and gray information of damaged bones of the patient, and the post-implantation data set $D_2$ contains the shape and material information of a personalized bone prosthesis; and normalizing pixel resolutions and gray ranges of $D_1$ and $D_2$, and marking the anatomical landmarks of the images in $D_1$;

S22: matching the shape model; registering and fitting the shape model in the statistical model to the bone CT images of the patient not implanted with a bone prosthesis, and calculating the shape parameter $b_s$ of the bone of the patient;

S23: matching the gray model; fitting the gray model in the statistical model to the bone images of the patient not implanted with a bone prosthesis, and calculating the gray parameter $b_g$ of the bone of the patient;

$\Phi_g b_g = g_p$, wherein $g_p$ represents the standard deviation between the gray vector of the sampled bone of the patient and the average gray vector, and $\Phi_g$ represents the gray feature matrix of the gray model in the statistical model;

S24: acquiring a bone prosthesis model; extracting the tagged image of a prosthesis implant from the CT images of the postoperative patient with a prosthesis by the threshold segmentation method, and transforming the tagged image of the prosthesis to a 3D surface model by the Marching Cubes algorithm;

S25: building a prosthesis template library; building a prosthesis template library based on the statistical model, the CT image data of the patient, the shape parameter and gray parameter of the bone of the patient, and the prosthesis model;

S3: carrying out personalized registration of the template library; obtaining the shape parameter and the gray parameter of the bone through personalized registration of the prosthesis template library and the CT images, and retrieving from the prosthesis template library a prosthesis model matching with the bone in the CT images best;

S31: preprocessing data; acquiring the bone CT images of the patient to be implanted with a bone prosthesis, carrying out unified space and gray normalization on the CT images, and marking the anatomical landmarks of the bone CT images of the patient;

S32: carrying out personalized registration and parameterized representation; carrying out personalized registration on the bone CT images of the patient by using the statistical model, and calculating the shape parameter $b_s'$ and the gray parameter $b_g'$ of the bone of the patient through matching of the shape model and the gray model;

S33: matching data; retrieving the data of template images stored in the prosthesis template library and similar to those of the bone of the patient from the prosthesis template library by using a similarity calculation formula according to the shape parameter and gray parameter describing the bone of the patient obtained by registration, the similarity calculation formula is as follows:

$$D = \lambda_1 \sum_{i=0}^{M}(b_s' - b_s)^2 + \lambda_2 \sum_{i=0}^{M}(b_g' - b_g)^2$$

wherein $\sum_{i=0}^{M}(b_s' - b_s)^2$ is the variance between the shape parameter of the bone of the patient and that of the template image in the prosthesis template library for measurement of the level of similarity in the shape of the bone between two images; $\Sigma_{i=0}^{M}(b_g'-b_g)^2$ is the variance between the gray parameter of the bone of the patient and that of the template image in the prosthesis template library for measurement of the level of similarity in the gray of the bone between two images; and $\lambda_1$ and $\lambda_2$ are weights of the shape similarity and the gray similarity, the sum thereof is 1, and the values of $\lambda_1$ and $\lambda_2$ are assigned according to different weights to realize the retrieval matching method based on the shape similarity or based on the gray similarity;

calculating the similarity D between the data in the prosthesis template library and the data of the patient, obtaining the template CT image most similar to the bone of the patient after comparison, and acquiring a bone prosthesis model corresponding to the image as the initial reference template for the personalized bone prosthesis of the patient for subsequent analysis and design of bone prostheses.

2. The personalized registration method for a template library of anatomical morphology and mechanical properties of materials of bone CT images according to claim 1, wherein the steps of modeling the shape in S14 are as follows:

S141: calculating shape vectors; calculating nonlinear spatial transformation between the sample image and the average template image by means of image registration, building a shape vector for each sample, and letting $si=[pi, li] \in R^{3N}$ as the shape vector of the sample i, wherein $pi \in R^{3N}$ is a 3D coordinate set of N pixels obtained by registering the average template to the sample i, and $li \in R^{3K}$ is a 3D coordinate set of K anatomical landmarks in the sample image;

S142: aligning the shape vectors si of all the samples by generalized Procrustes analysis;

S143: modeling the shape change of the bone by principal component analysis; the shape model is as follows:

$$s = \bar{s} + \Phi_s b_s$$

wherein $\bar{s} \in R^{3N}$ represents the average shape of the sample set, $\Phi_s \in R^{3(N+K) \times M}$ represents an eigenvector matrix obtained by principal component analysis of the sample set, and M feature vectors represent M bone deformation patterns learned by the shape model; $b_s \in R^M$ is a shape parameter, and M elements in $b_s$ respectively represent weights of M deformation patterns in $\Phi_s$ superimposed with the average shape; and $s \in R^{3(N+K)}$ represents the shape of the model, s is under control of $b_s$, and the purpose of controlling model deformation is achieved by adjusting the value of $b_s$.

3. The personalized registration method for a template library of anatomical morphology and mechanical properties of materials of bone CT images according to claim 1, wherein the steps of matching the shape model in S22 are as follows:

S221: sampling; carrying out equidistant sampling on the vertexes of the average shape in the shape model, and selecting a small number of sampling points for subsequent calculation;

S222: carrying out personalized registration; obtaining the mapping relationship, i.e., deformation field, between the average template and the bone image of the patient by the nonlinear registration method of the image, and deforming the vertexes of the average shape in the shape model by using the deformation field to obtain a shape vector describing the bone of the patient;

the gray similarity measure between images and the distance measure of the anatomical landmarks are used as the constraints for the loss function of nonlinear registration, and the objective function is as follows:

$$E = \omega_i E_i + \omega_l E_l$$

wherein E is the weighted similarity measure between the template and the image of the patient, $E_i$ is the gray similarity measure between the template and the image of the patient, and $E_l$ is the distance measure of the anatomical landmarks; and $\omega_i$ and $\omega_l$ are weights of the two measures, and the sum thereof is 1;

S223: aligning the registered shape vector of the bone of the patient with the average shape vector, wherein similarity transformation is composed of a scaling factor and a rotation matrix, the scaling factor is obtained by calculating the ratio of the distance between the vertex and the centroid of the registered shape vector of the bone to that of the average shape vector, and the rotation matrix is obtained by singular value decomposition of the vertex matrixes of the two shape vectors;

S224: setting the number of the shape parameters $b_s$; directly defining the number of the shape parameters $b_s$ or selecting the number of the shape parameters $b_s$ capable of retaining more than 95% of data information; and extracting the corresponding shape feature matrix $\Phi_s$ from the shape model according to the number of the shape parameters $b_s$;

S225: calculating the shape parameter $b_s$ of the bone of the patient; carrying out linear regression fitting by least squares according to the shape feature matrix $\Phi_s$ extracted from the shape model and the registered shape vector of the bone of the patient, and solving the system of linear equations $\Phi_s b_s = s_p$ to obtain the shape parameter $b_s$ of the bone of the patient, wherein $s_p$ represents the displacement deviation between the shape vector of the bone of the patient and the average shape vector, and $\Phi_s$ represents the shape feature matrix contained in the shape model in the statistical model.

* * * * *